（12） United States Patent
Ohba et al.

(10) Patent No.: US 10,235,560 B2
(45) Date of Patent: Mar. 19, 2019

(54) IMAGE PROCESSING APPARATUS, IMAGE PROCESSING METHOD, AND IMAGE COMMUNICATION SYSTEM

(71) Applicant: Sony Interactive Entertainment Inc., Tokyo (JP)

(72) Inventors: Akio Ohba, Kanagawa (JP); Hiroyuki Segawa, Kanagawa (JP); Tetsugo Inada, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 34 days.

(21) Appl. No.: 15/712,343

(22) Filed: Sep. 22, 2017

(65) Prior Publication Data

US 2018/0012064 A1   Jan. 11, 2018

Related U.S. Application Data

(63) Continuation of application No. 14/944,478, filed on Nov. 18, 2015, now Pat. No. 9,798,920, which is a (Continued)

(30) Foreign Application Priority Data

May 24, 2010   (JP) ................................. 2010-118665

(51) Int. Cl.
*H04N 13/341*      (2018.01)
*G06K 9/00*         (2006.01)
(Continued)

(52) U.S. Cl.
CPC ..... *G06K 9/00221* (2013.01); *G06K 9/00281* (2013.01); *G06T 11/00* (2013.01);
(Continued)

(58) Field of Classification Search
CPC .................................................. G06K 9/00221
(Continued)

(56) References Cited

U.S. PATENT DOCUMENTS 6,771,277 B2   8/2004   Oba
7,525,565 B2   4/2009   Van Geest
(Continued)

FOREIGN PATENT DOCUMENTS

JP   1251989 A   10/1989
JP   2656787 B2   9/1997
(Continued)

OTHER PUBLICATIONS

International Search Report for corresponding PCT Application PCT/JP2010/007616, dated Mar. 22, 2011.
(Continued)

*Primary Examiner* — Yulin Sun
(74) *Attorney, Agent, or Firm* — Matthew B. Dernier, Esq.

(57) ABSTRACT

Methods and apparatus provide for: capturing an image of an object, which includes a face of a person wearing an optical display apparatus by which to observe a stereoscopic image that contains a first parallax image and a second parallax image obtained when the object in a three-dimensional (3D) space is viewed from different viewpoints; identifying the optical display apparatus included in the image of the object; and generating an image of the face of the person that does not include the optical display apparatus by excluding the identified optical display apparatus, and instead by adding features of the face of the person to a region in which the identified optical display apparatus is excluded.

18 Claims, 12 Drawing Sheets

Related U.S. Application Data continuation of application No. 13/605,571, filed on Sep. 6, 2012, now Pat. No. 9,225,973, which is a continuation of application No. PCT/JP2010/007616, filed on Dec. 28, 2010.

(51) Int. Cl.
| | | |
|---|---|---|
| *H04N 7/14* | (2006.01) | |
| *G06T 11/00* | (2006.01) | |
| *G06T 19/20* | (2011.01) | |
| *H04N 13/239* | (2018.01) | |

(52) U.S. Cl.
CPC ............ *G06T 19/20* (2013.01); *H04N 7/141* (2013.01); *H04N 7/147* (2013.01); *H04N 13/239* (2018.05); *H04N 13/341* (2018.05); *G06T 2200/04* (2013.01); *G06T 2207/30201* (2013.01)

(58) Field of Classification Search
USPC .......................................................... 348/49
See application file for complete search history.

(56) References Cited

U.S. PATENT DOCUMENTS

| | | | |
|---|---|---|---|
| 2002/0097247 A1 | 7/2002 | Oba | |
| 2006/0193515 A1* | 8/2006 | Kim | G06K 9/00228 382/173 |
| 2006/0209181 A1 | 9/2006 | Van Geest | |
| 2007/0260687 A1* | 11/2007 | Rao | H04L 12/1827 709/204 |
| 2009/0279786 A1* | 11/2009 | Kasugai | G01B 11/03 382/195 |
| 2010/0201790 A1* | 8/2010 | Son | G02B 27/2264 348/53 |

FOREIGN PATENT DOCUMENTS

| | | |
|---|---|---|
| JP | 2002196855 A | 7/2002 |
| JP | 2005092657 A | 4/2005 |
| JP | 2006520570 A | 9/2006 |

OTHER PUBLICATIONS

International Preliminary Report on Patentability for corresponding PCT Application PCT/JP2010/007616, dated Dec. 10, 2012.
Office Action for corresponding JP Application No. 2010-118665, dated May 10, 2011.
Office Action for corresponding JP Application No. 2010-118665, dated Mar. 15, 2011.
Office Action for related U.S. Appl. No. 13/605,571, 12pgs., dated Feb. 12, 2015.

* cited by examiner

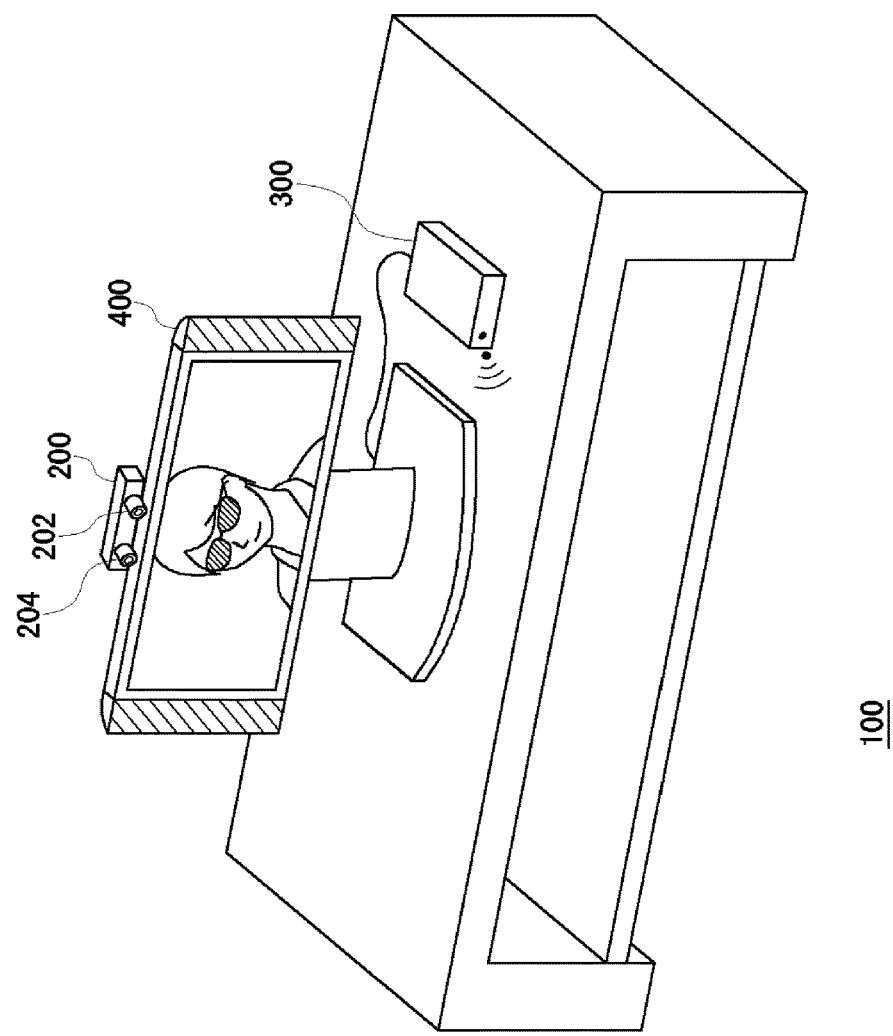
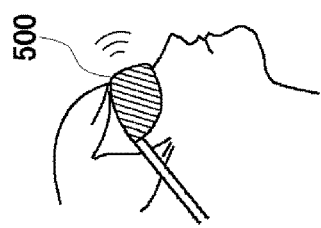
FIG.1

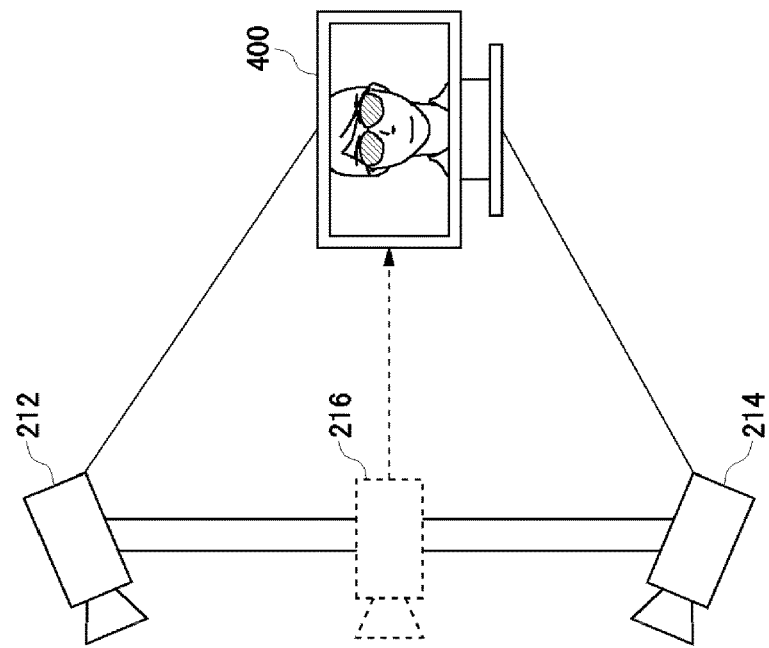
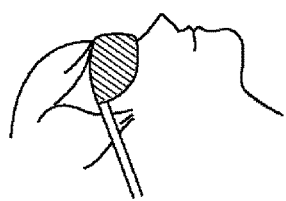
FIG.6

IMAGE PROCESSING APPARATUS, IMAGE PROCESSING METHOD, AND IMAGE COMMUNICATION SYSTEM

CROSS REFERENCE TO RELATED APPLICATIONS

This is a continuation application of U.S. patent application Ser. No. 14/944,478, allowed and accorded a filing date of Nov. 18, 2015, which is a continuation application of U.S. Pat. No. 9,225,973 (U.S. patent application Ser. No. 13/605, 571), accorded a filing date of Sep. 6, 2012, which is a continuation application of International Application No. PCT/JP2010/007616, filed Dec. 28, 2010, which claims priority to JP 2010-118665, filed May 24, 2010, the entire disclosures of which are hereby incorporated by reference.

BACKGROUND OF THE INVENTION

1. Field of the Invention

The present invention relates to an image processing apparatus, an image processing method, and a image communication system.

2. Description of the Related Art

With the ongoing sophistication of consumer television of recent years, three-dimensional (3D) television capable of offering stereoscopic vision is gaining in popularity. Although there are a variety of methods for realizing 3D television, some of the methods require a user to wear dedicated eyeglasses for observing the stereoscopic images.

In a scheme where the dedicated glasses are required to observe stereoscopic images, the user naturally must wear the dedicated glasses. The inventor of the present inventions directed his attentions to the fact that the user must wear the dedicated glasses, and has reached a realization that not only the eyeglasses can be used to observe the stereoscopic images but also new field of application for the eyeglasses can be sought.

SUMMARY OF THE INVENTION

The present invention has been made in view of the circumstances, and a purpose thereof is to provide a new field of use of eyeglasses that are used to observe stereoscopic images.

In order to resolve the above-described problems, one embodiment of the present invention provides an image processing apparatus. The image processing apparatus includes: an image pickup unit configured to take an image of an object, which includes a face of a person wearing glasses by which to observe a stereoscopic image that contains a first parallax image and a second parallax image obtained when the object in a three-dimensional (3D) space is viewed from different viewpoints; a glasses identifying unit configured to identify the glasses included in the image of the object taken by the image pickup unit; a face detector configured to detect a facial region of the face of the person included in the image of the object taken by the image pickup unit, based on the glasses identified by the glasses identifying unit; and an augmented-reality special rendering unit configured to add a virtual feature to the facial region detected by the face detector.

Another embodiment of the present invention relates to an image communication system. The system includes at least two of the above-described image processing apparatuses, and the at least two image processing apparatuses are connected in a manner that permits mutual communication via a communication line.

Still another embodiment of the present invention relates to an image processing method executed by a processor. The method includes: capturing an image of an object, which includes a face of a person wearing glasses by which to observe a stereoscopic image that contains a first parallax image and a second parallax image obtained when the object in a three-dimensional (3D) space is viewed from different viewpoints; identifying the glasses from the captured image of the object; detecting a facial region of the face of the person from the captured image of the object, based on the identified glasses; and adding a virtual feature to the detected facial region.

Optional combinations of the aforementioned constituting elements, and implementations of the invention in the form of methods, apparatuses, systems, recording media, computer programs, and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 1 is an illustration giving an overview of an image processing system according to an embodiment;

FIG. 2 is a diagram showing a relationship between the shutter timing of 3D glasses and the timing with which a backlight of a 3D television turns on;

FIG. 6 is a diagram for explaining an operation of an image pickup position correcting unit according to an embodiment;

DETAILED DESCRIPTION OF THE INVENTION

Figure 2:
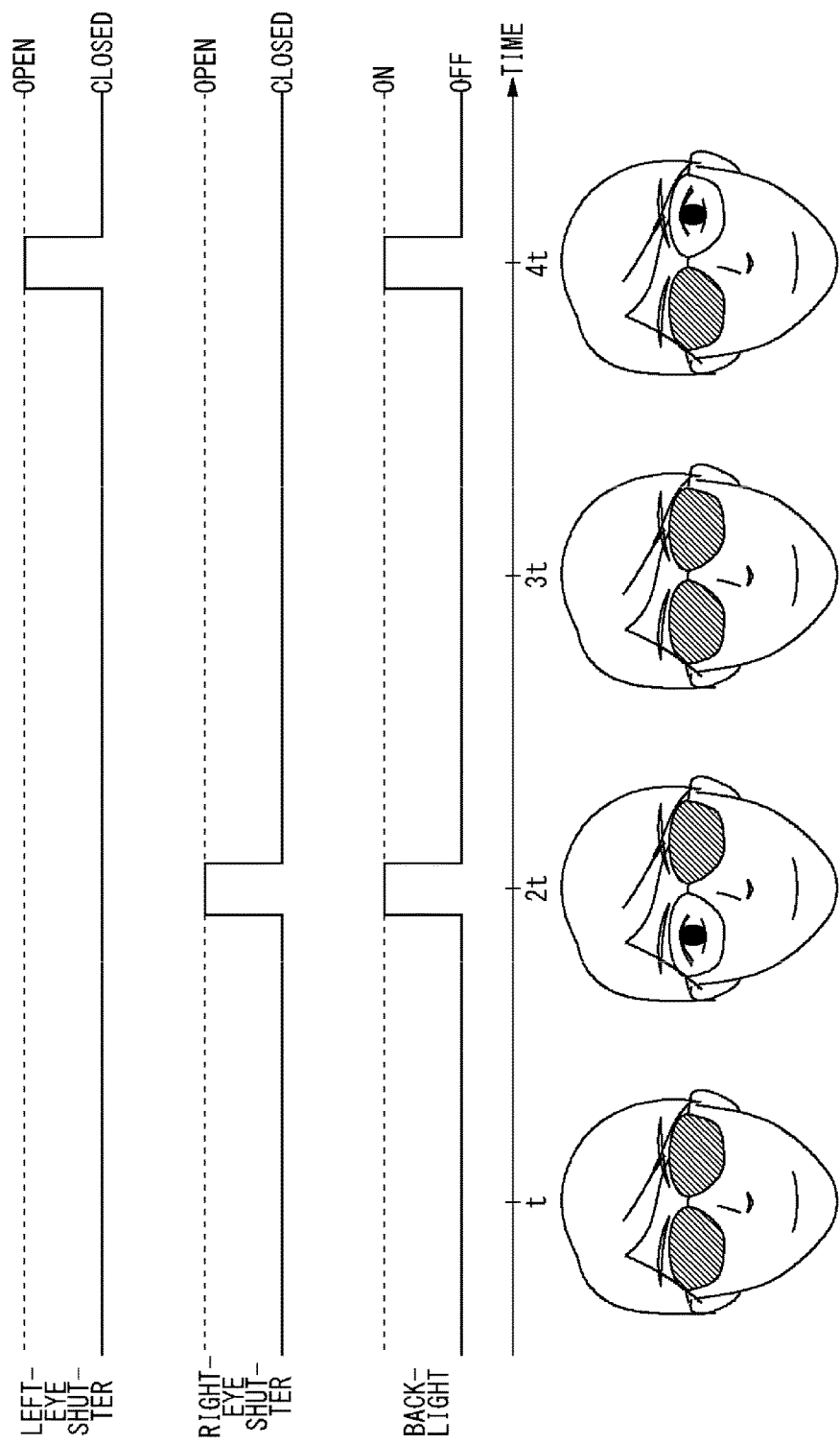

The invention will now be described by reference to the preferred embodiments. This does not intend to limit the scope of the present invention, but to exemplify the invention.

A description will be given of an outline of preferred embodiments. In the preferred embodiments, images including an image of the face of a person who wears the eyeglasses with which to observe stereoscopic images are acquired and then a facial region of the face of the person is detected using the glasses as a landmark. The thus acquired images are subjected to a special rendering of augmented reality, by which a virtual feature is added, around the detected facial region.

FIG. 1 is an illustration giving an overview of an image processing system 100 according to an embodiment. The image processing system 100 includes a stereo camera 200, an image processing apparatus 300, a three-dimensional (3D) television 400, 3D glasses 500 used to observe the stereoscopic images displayed by the 3D television 400.

The stereo camera 200 includes a first camera 202 and a second camera 204 for taking images of a user, who is an object to be captured, from different points of view. Here, the images of an object as seen from different points of view in a three-dimensional (3D) space are called "parallax images". Since the left eye and the right eye of a human are about 6 cm situated apart from each other, there occurs a parallax (disparity) between the image seen by the left eye and the image seen by the right eye. And it is considered that the human brain recognizes the depth of objects using the parallax images sensed through the left and right eyes. Accordingly, if parallax images sensed through the left eye and the right eye are projected onto the respective eyes, the brain will recognize the parallax images as an image having depths, or a perspective image. In the following, the images of an object, including left-eye parallax images and right-eye parallax images, as seen from different points of view in the 3D space will be simply referred to as "stereoscopic image(s)". The stereo camera 200 may be realized by use of solid-state image pickup devices such as CCD (Charge-Coupled Device) sensors and CMOS (Complementary Metal Oxide) sensors.

The image processing apparatus 300 processes the images (video images) of an object taken by the stereo camera 200. The detail of the image processing apparatus 300 will be discussed later. The 3D television 400 displays three-dimensional images generated by the image processing apparatus 300. Through the 3D glasses 500, the user can recognize the images displayed by the 3D television as stereoscopic images having depths.

There are a variety of 3D television systems for showing perspective images by use of parallax images to human viewers. However, in the present embodiment a description is given of a 3D television, as an example, using a system where left-eye parallax images and right-eye parallax images are displayed alternately in time division, namely in a time sharing manner.

The 3D television 400 presents the left-eye parallax images and the right-eye parallax images, generated by the image processing apparatus 300, alternately in time division. The image processing apparatus 300 transmits the display timing of parallax images on the 3D television 400 to the 3D glasses 500 as a synchronization signal. The 3D glasses 500 operates the shutter on the left lens or the right lens according to the synchronization signal received. The shutter may be implemented by use of known liquid crystal shutter technology, for instance.

More specifically, when the 3D television 400 displays a parallax image for the left eye, the 3D glasses 500 shields the images entering the right eye by closing the shutter for the right-eye lens. Thus, when the 3D television 400 displays a parallax image for the left eye, the parallax image for the left eye is projected onto the left eye of the user only. On the other hand, when the 3D television 400 displays a parallax image for the right eye, the 3D glasses 500 closes the shutter for the left-eye lens with the result that the parallax image for the right eye is projected onto the right eye of the user only.

FIG. 1 illustrates a case where the image processing apparatus 300 and the 3D television 400 are different from those described above. For example, the image processing apparatus 300 may be a stationary game device. Also, all or part of functions of the image processing apparatus 300 may be incorporated into the 3D television as a part thereof.

FIG. 2 is a diagram showing a relationship between the shutter timing of the 3D glasses 500 and the display timing of parallax images in the 3D television 400. FIG. 2 indicates that at time 2*t* the right-eye shutter of the 3D glasses 500 is open for a predetermined time duration (e.g., 10 milliseconds) and the backlight of the display panel of the 3D television 400 simultaneously lights up for the same time duration. Also, at time 4*t* the left-eye shutter of the 3D glasses 500 is open and the backlight of the display panel of the 3D television 400 simultaneously lights up for the same time duration. At other times than time 2*t* and time t4, both the right-eye shutter and the left-eye shutter of the 3D glasses 500 are closed and, at the same time, the backlight of the display panel of the 3D television 400 turns off.

At time 2*t* the 3D television 400 displays right-eye parallax images to present the right-eye parallax images to the right eye of the user. And at time 4*t* the 3D television 400 displays left-eye parallax images to present the left-eye parallax images to the left eye of the user. This can present perspective 3D images having a sense of depth to the user.

Figure 3:
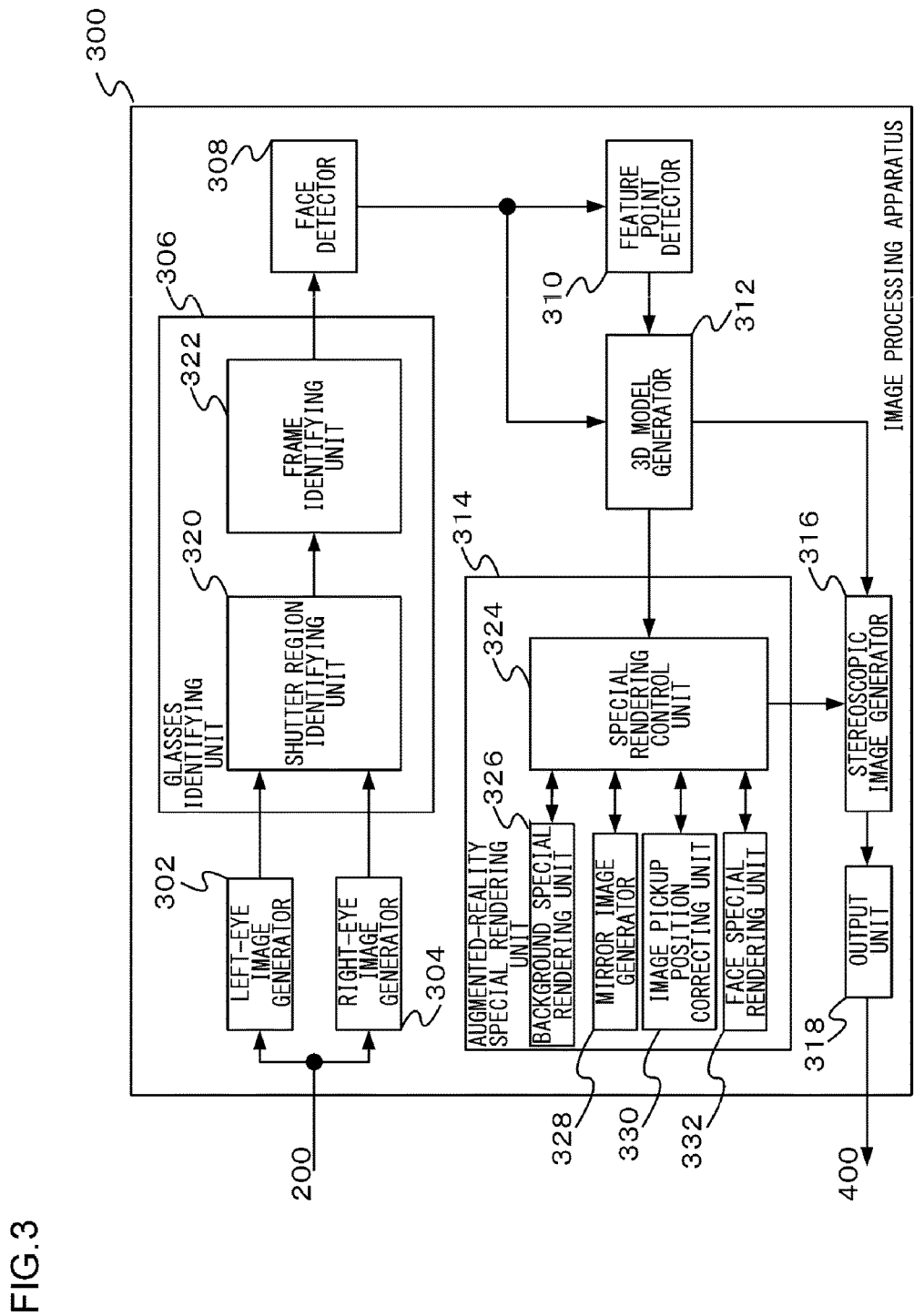
FIG. 3 illustrates a functional structure of an image processing apparatus according to an embodiment.

FIG. 3 illustrates a functional structure of an image processing apparatus 300 according to an embodiment. The image processing apparatus 300 includes a left-eye image generator 302, a right-eye image generator 304, a glasses identifying unit 306, a face detector 308, a feature point detector 310, a 3D model generator 312, an augmented-reality special rendering unit 314, a stereoscopic image generator 316, and an output unit 318.

The left-eye image generator 302 visualizes the information acquired from the first camera 202 so as to generate left-eye parallax images. The right-eye image generator 304 visualizes the information acquired from the second camera 204 so as to generate right-eye parallax images.

The glasses identifying unit 306 identifies the 3D glasses 500 from the images of an object that are captured by the stereo camera 200 and then visualized by the left-eye image generator 302 and the right-eye image generator 304. As described earlier, implemented in the present embodiment is the shutter glasses where the shutter on the left lens or the right lens is operated according to the synchronization signal received from the image processing apparatus 300. Accordingly, the glasses identifying unit 306 includes a shutter region identifying unit 320 and a frame identifying unit 322.

The 3D glasses 500 alternately closes the left lens and the right lens in time division, thereby blocking alternately the images projected onto the left eye and the right eye, respectively. This means that, in the captured images of the face of the user wearing the 3D glasses 500, each of the user's eyes looking through the left and right lens of the 3D glasses 500 is alternately blocked and the image of the blocked lens is not captured. Thus, the shutter region identifying unit 320 identifies the 3D glasses 500 in a manner such that a region, where the passage of the image of the object is blocked from the images of the object including the image of the face of user wearing the 3D glasses 500, is detected as a lens region.

With the lens region identified by the shutter region identifying unit 320 as a starting point, the frame identifying unit 322 tracks the glasses frame of the 3D glasses 500 so as to identify the 3D glasses 500. The face detector 308 detects the face of the user with a glasses region identified by the glasses identifying unit 306.

Thus, the user watching the 3D television 400 of a type where the dedicated glasses are worn is required to wear the 3D glasses 500. It is therefore possible to start identifying the glasses region. Where, in particular, the shutter-type 3D glasses are used, it is possible to identify the lens region of the 3D glasses 500 as a landmark. The lens region is a somewhat large region as compared with the face of a human and therefore the lens region can be detected stably and quickly. For example, as compared with a case where the glasses frame is to be detected, the lens has a two-dimensional extensity and therefore it can be detected stably and quickly.

Figure 4A:
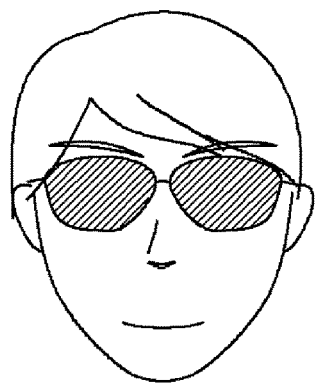
FIG. 4A illustrates an image obtained when the shutters of left and right lenses of 3D glasses are closed.
Figure 4B:
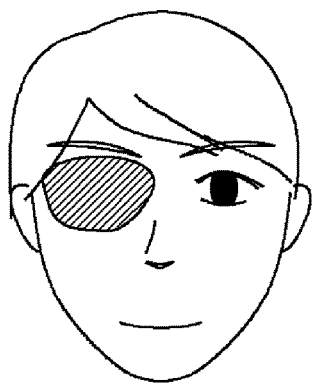
FIG. 4B illustrated an image when the shutter of a right-eye lens is closed and the shutter of a left-eye lens is open.
Figure 4C:
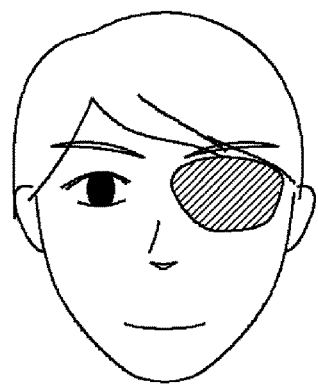
FIG. 4C illustrated an image when the shutter of a left-eye lens is closed and the shutter of a right-eye lens is open.
Figure 4D:
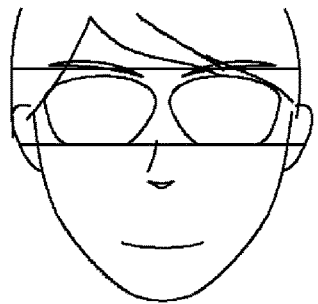
FIG. 4D is a diagram showing a result obtained when the facial region of the face of a user is extracted with the lens region of 3D glasses as a starting point.

FIGS. 4A to 4D show the images of the face of the user wearing the 3D glasses and the facial regions of the face of the user extracted based on the shutter region. FIG. 4A illustrates an image obtained when the shutters of the left and right lenses of the 3D glasses 500 are closed. FIG. 4B illustrated an image when the shutter of the right-eye lens is closed and the shutter of the left-eye lens is open. FIG. 4C illustrated an image when the shutter of the left-eye lens is closed and the shutter of the right-eye lens is open. FIG. 4D is a diagram showing a result obtained when the facial region of the user's face is extracted with the lens region of the 3D glasses 500 as a starting point.

The shutter region identifying unit 320 calculates a difference between an image obtained when the shutters of the left and right lens of the 3D glasses 500 are closed as shown in FIG. 4A and an image when the shutter of the right-eye lens of the 3D glasses 500 is closed and the shutter of the left-eye lens thereof is open as shown in FIG. 4B, for instance. Since there is a large difference in the left-eye lens region therebetween, the difference value of pixels in this region will be large. Thus, a region where the difference value is large is identified as the left-eye lens region by the shutter region identifying unit 320. Also, the shutter region identifying unit 320 calculates a difference between the image obtained when the shutters of the left and right lens of the 3D glasses 500 are closed as shown in FIG. 4A and an image when the shutter of the left-eye lens of the 3D glasses 500 is closed and the shutter of the right-eye lens thereof is open as shown in FIG. 4C. Thereby, the shutter region identifying unit 320 can identify the right-eye lens region.

Once the lens region of the 3D glasses is identified, the frame identifying unit 322 can identify the frame of the 3D glasses 500 by tracking an edge connected to the lens region thereof. Also, once the lens region of the 3D glasses 500 is identified, the both eyes of the user can be identified and therefore the approximate size of the face of the user can be estimated based on the distance between the eyes. The face detector 308 detects a flesh-color region and the edge with the lens region of the 3D glasses as the starting point and thereby can identify a facial region of the user's face.

Figure 5B:
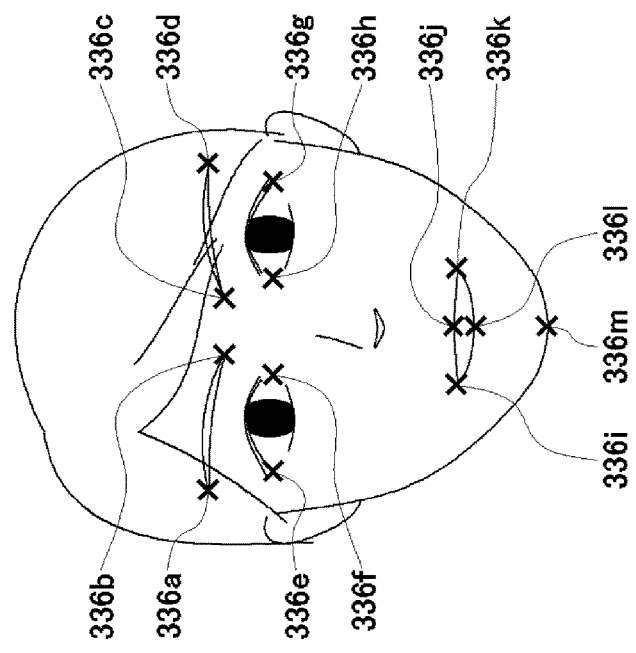
FIG. 5B illustrate feature points in the expression areas shown in FIG. 5A.
Figure 5A:
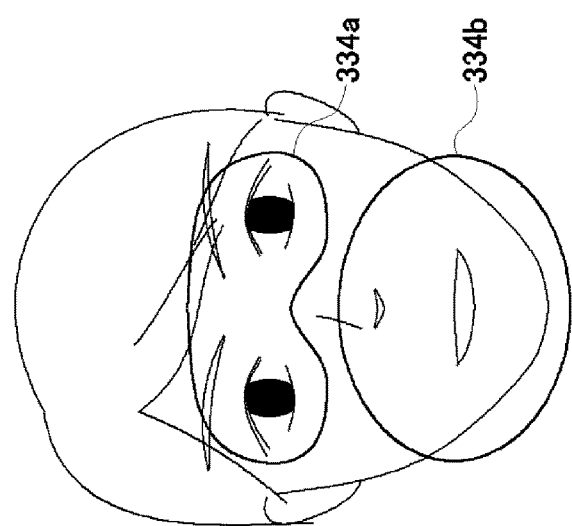
FIG. 5A illustrates expression areas near the eyes and mouth where a facial expression is more likely to appear.

FIGS. 5A and 5B illustrate an expression area of the person and features points in the expression area. FIG. 5A illustrates the expression area near the eyes and mouth where the facial expression is more likely to appear. FIG. 5A shows an expression area 334a near the eyes and an expression area 334b near the mouth. Note that the expression area 334a and the expression area 334b will be generically referred to as "expression area 334" or "expression areas 334". The expression area 334 is an area where the emotion (e.g., anger, confusion, and laughter) of the person is more likely to appear and will be used to render a special effect of augmented reality (AR) discussed later.

FIG. 5B illustrate feature points in the expression areas 334 wherein these feature points are collectively denoted by the reference numeral(s) 334. The feature points are the ends of eyebrows (denoted by the reference numerals 336a and 336d), the inner ends of eyebrows (336b and 336c), the tails of eyes (336e and 336g), the inner corners of eyes (336f and 336h), the corners of mouth (336i and 336k), the center of upper lip (336j), the center of lower lip (336l), chin (336m), and the centers of pupils, for instance. These feature points are used to calculate the depth information on the face of the user based on the rendering of augmented reality (described later), the orientation of the user's face, the analysis of the expression, and the principle of triangulation.

Now refer back to FIG. 3. The feature point detector 310 detects the feature points as shown in FIG. 5B, based on the facial region detected by the face detector 308. This can be achieved by use of a general-purpose technique such as an edge detection method. The 3D model generator 312 maps the face of the user into a 3D model of a versatile face of the person. This can be accomplished as follows, for example. That is, the feature points detected by the feature point detector 310 are mapped to the vertices of a polygon using a wire frame model of the face constituted by a plurality of polygons and the like. Then the facial region detected by the face detector 308 is texture-mapped. Alternatively, a 3D model may be produced by calculating the depth information on the face of the user from the feature points by use of the principle of triangulation. Hereinbelow, the image of the facial region of the face of the user detected by the face detector 308 will be referred to as "expression image" also, and the feature points of the face of the user detected by the feature point detector 310 will be referred to as "expression data" also.

The augmented-reality special rendering unit 314 adds virtual features to the facial region of the face of the person detected by the face detector and its surrounding regions. Here, the "augmented reality" is a collective term for a way of thinking where a 3D model is first projected into a real space, displayed on the 3D television 400, which the user wearing the 3D glasses 500 observes and then various virtual features are added to this real space, and the techniques by which to achieve such a way of thinking.

More to the point, the augmented-reality special rendering unit 314 adds various augmented realities based on the 3D model of the user's face generated by the 3D model generator 312. For that purpose, the augmented-reality special rendering unit 314 includes a background special rendering unit 326, a mirror image generator 328, an image pickup position correcting unit 330, a face special rendering unit 332, and a special rendering control unit 324 for controlling these components and the operations of thereof.

The background special rendering unit 326 renders a special effect of augmented reality to a background region. Here, the background region is a region other than the facial region which has been detected by the face detector 308 and then modeled by the 3D model generator 312. As will be discussed later, the image processing system 100 may be used as a television telephone, for instance, if the image processing system 100 is connected to other image processing systems 100 via a network. In such a case, the stereo camera 200 may generally well be installed within a home of the user. However, there are cases where it is not preferable that what is actually seen in the home is transmitted as it is. To cope with this, the background special rendering unit 326 replaces the background region with a different image, scumbles the background region or the like. Thus, the present embodiment is advantageous in that undisguisedly transmitting what is actually seen in the home can be prevented.

FIG. 6 is a diagram for explaining an operation of the image pickup position correcting unit 330 according to an embodiment. Since the user normally watches the 3D television 400 from the front, the stereo camera 220 cannot be installed in the position where the stereo camera 220 captures the images of the user from right in front of the user. Instead, the stereo camera 220 is installed on top of the 3D television (the reference numeral 212 in FIG. 6) or at the bottom thereof (the reference numeral 214 in FIG. 6), for instance. A midpoint (the reference numeral 216) is between the top and bottom of the 3D television. In such a case, the image of the user captured by the stereo camera 200 will be either an image looking down at the user or an image looking up at the user.

Since the 3D model generator 312 generates a 3D model of the face of the user, the image pickup position correcting unit 330 can produce images obtained when the image of the user is captured from an arbitrary direction. Thus, the image pickup position correcting unit 330 produces images that would be obtained when the image of the user is captured from the frontal direction, based on the 3D model of the face of the user generated by the 3D model generator 312. Thereby, the user can observe the images of his/hers that would be captured from right in front of himself/herself. If the television telephone is to be used, the user can make eye contact with a conversation partner and vice versa. This can reduce a sense of discomfort in making conversation with the conversation partner, as compared with the case where the images taken from the directions other than those taken from right in front of the conversation partner are used in making conversation with each other.

Now refer back to FIG. 3. The face special rendering unit 332 excludes the 3D glasses 500 identified by the glasses identifying unit 306 and generates images of the face where the user is not wearing the 3D glasses 500. The face special rendering unit 332 performs an image processing of applying makeup on the user's face, beautifying the user's skin and the like. The face special rendering unit 332 renders a special effect of disguise through an image processing where, for example, the user's face is replaced by another person's face or an animal character or the like. In this manner, the face special rendering unit 332 renders a special effect to the face of a user who is considered an important object. This is advantageous in that an unusual and extraordinary rendering can be presented to the user.

Figure 7:
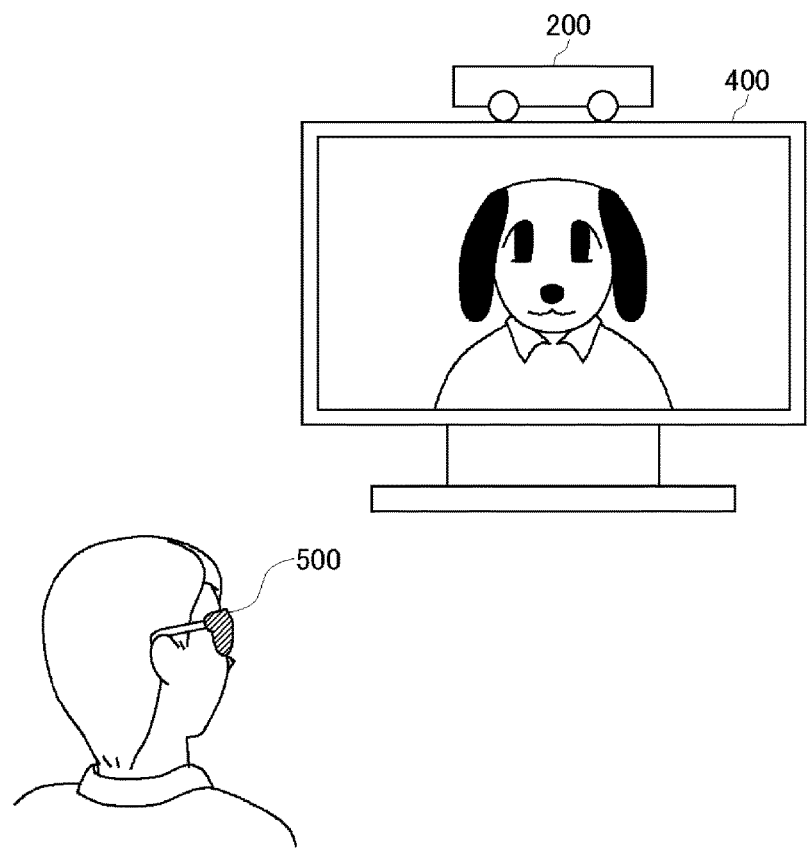
FIG. 7 illustrates an exemplary special rendering of disguise by a face special rendering unit according to an embodiment.

FIG. 7 illustrates an exemplary special rendering of disguise by the face special rendering unit 332 according to an embodiment. In this example, the face special rendering unit 332 renders a special effect of disguising the user's face to a dog face in a manner such that the feature points detected by the feature point detector 310 and an image of a dog prepared in advance and its feature points (not shown) are matched with each other.

The mirror image generator 328 generates a 3D model, where the image of the user is reflected in a mirror, based on the 3D model of the user's face detected by the face detector 308 and generated by the 3D generator 312. The user can observe his/her own face, to which the special effect of augmented reality has been rendered, as the images reflected in the mirror before the transmission of television-telephone signals. Use of the image processing system using the 3D glasses 500 worn by the user allows the user to check his/her own figure, to which a special effect of augmented reality has been rendered, before entering a cyber-world and thereby allows the user to feel the switch from an ordinary scene to the extraordinary.

Figure 8:
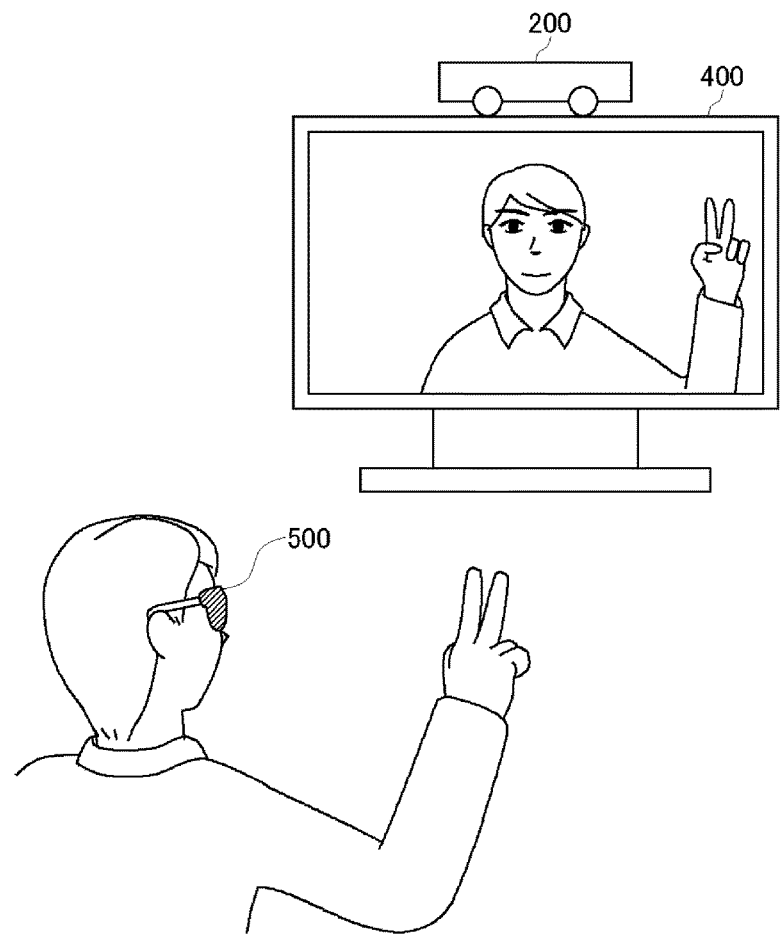
FIG. 8 illustrates an exemplary mirror image that a mirror image generator according to an embodiment generates based on images excluding the images of 3D glasses.

FIG. 8 illustrates an exemplary mirror image that the mirror image generator 328 generates based on images excluding the images of 3D glasses 500. Although the user is actually wearing the 3D glasses 500, the images in the case where no 3D glasses 500 are worn are presented on a screen of the 2D television 400. Also, an actual mirror image of the user is presented on the screen of the 3D television 400.

It is required to wear the 3D glasses 500 in order for the user to observe stereoscopic images. However, the user does not necessarily wish to display on the 3D television 400 his/her direct images showing that he/she wears the 3D glasses 500 and to transmit those images to the conversation partner. Rather, there may be cases where the user does not take an active stance toward displaying the images as it is and transmitting them as it is but wishes to render an extraordinary special effect to the images.

In the present embodiment, the 3D model generator 312 generates the 3D model of the user's face, so that extraordinary special effects can be rendered to the images through various augmented realities. Then the 3D glasses 500 can be used in the face detection processing as a preprocessing for generating the 3D model. This is because it is guaranteed that the user wears the 3D glasses 500.

The special rendering control unit 324 receives instructions from the user via a user interface such as a not-shown remote controller and then controls the special rendering performed by each component of the augmented-reality special rendering unit 314. Though not shown in the Figures, the augmented-reality special rendering unit 314 may be provided with a function of adding other augmented realities. Here, the other augmented realities include an augmented reality where characters are displayed near the user's face using a "speech balloon" technique, for instance.

The stereoscopic image generator 316 generates stereoscopic images including the left-eye parallax images and the right-eye parallax images obtained when a 3D model of the user in a virtual 3D space is seen from different points of view, based on the 3D model of the user generated by the 3D model generator 312 or based on the 3D model of the user to which the augmented-reality special rendering unit 314 has rendered a special effect. The output unit 318 outputs the stereoscopic images generated by the stereoscopic image generator 316 to the 3D television 400 or transmits the stereoscopic images to other image processing system(s) 100 via a network such as the Internet.

FIG. 3 illustrates a functional structure to realize the image processing apparatus 300 according to the present embodiment, and other structural components are omitted in FIG. 3. Each element shown in FIG. 3 and described as a functional block for performing various processings may be implemented hardwarewise by a CPU, main memory and other LSIs, and softwarewise by image processing programs or the like loaded in the main memory. Therefore, it is understood by those skilled in the art that the functional blocks may be implemented by a variety of manners including hardware only, software only or a combination of both, and are not limited to any particular one.

Figure 9:
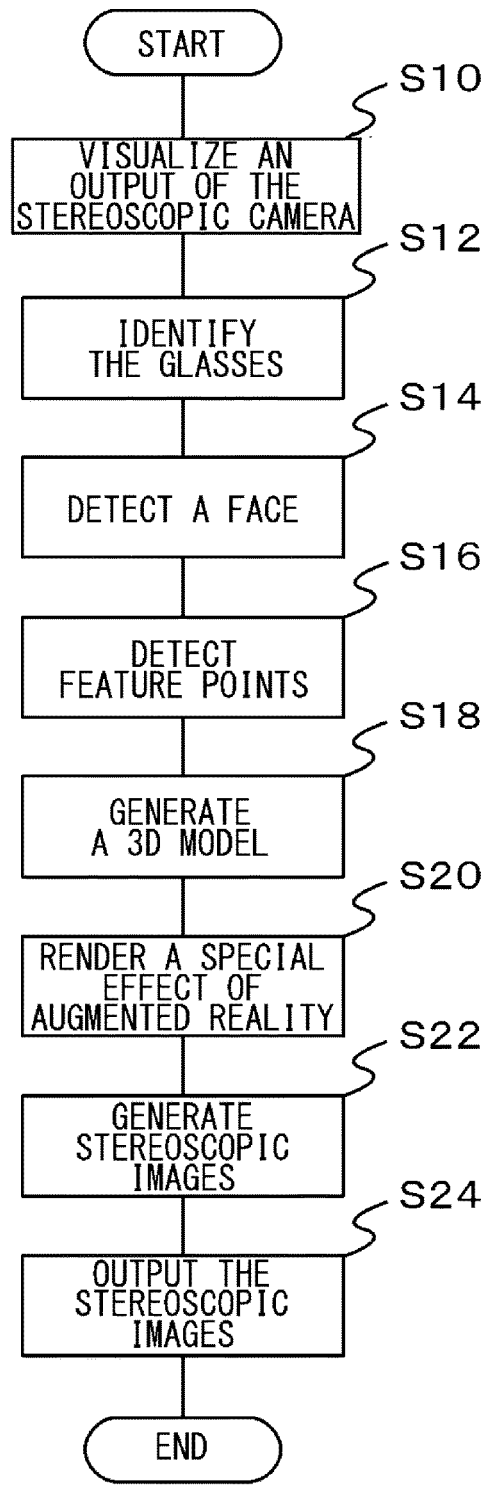
FIG. 9 is a flowchart showing a procedure for processing the augmented reality in an image processing apparatus according to an embodiment.

FIG. 9 is a flowchart showing a procedure for processing the augmented reality in the image processing apparatus 300 according to the present embodiment. In the following flowchart, the procedure of each structural component is shown using S (the capital letter of "Step"), which means a step, and numbers combined. The processing of the flowchart shown in FIG. 9 starts when the left-eye image generator 302 and the right-eye image generator 304 visualize the outputs of the stereo camera 200.

The left-eye image generator 302 and the right-eye image generator 304 visualize an object, including the face of the user wearing the 3D glasses 500, outputted from the stereo camera 200 (S10). The glasses identifying unit 306 identifies the 3D glasses 500 from the images of the object visualized by the left-eye image generator 302 and the right-eye image generator 304 (S12).

Based on the 3D glasses identified by the glasses identifying unit 306, the face detector 308 detects a facial region of the face of the user from the object, including the face of the user, visualized by the left-eye image generator 302 and the right-eye image generator 304 (S14). The feature point detector 310 detects feature points from the facial region of the user's face detected by the face detector 308 (S16).

The 3D model generator 312 generates the 3D model of the user's face based on both the facial region of the user's face detected by the face detector 308 and the feature points detected by the feature point detector 310 (S18). The augmented-reality special rendering unit 314 renders a special effect of augmented reality, based on the 3D model of the user's face generated by the 3D model generator 312 (S20).

The stereoscopic image generator 312 generates stereoscopic images including the left-eye parallax images and the right-eye parallax images obtained when the 3D model of the user in a virtual 3D space is seen from different points of view, based on the 3D model of the user generated by the 3D model generator 312 or based on the 3D model of the user to which the augmented-reality special rendering unit 314 has rendered a special effect (S22). The output unit 318 outputs the stereoscopic images generated by the stereoscopic image generator 316 to an external device (S24). As the output unit 318 has outputted the stereoscopic images, the processing in this flowchart will be terminated.

Figure 10:
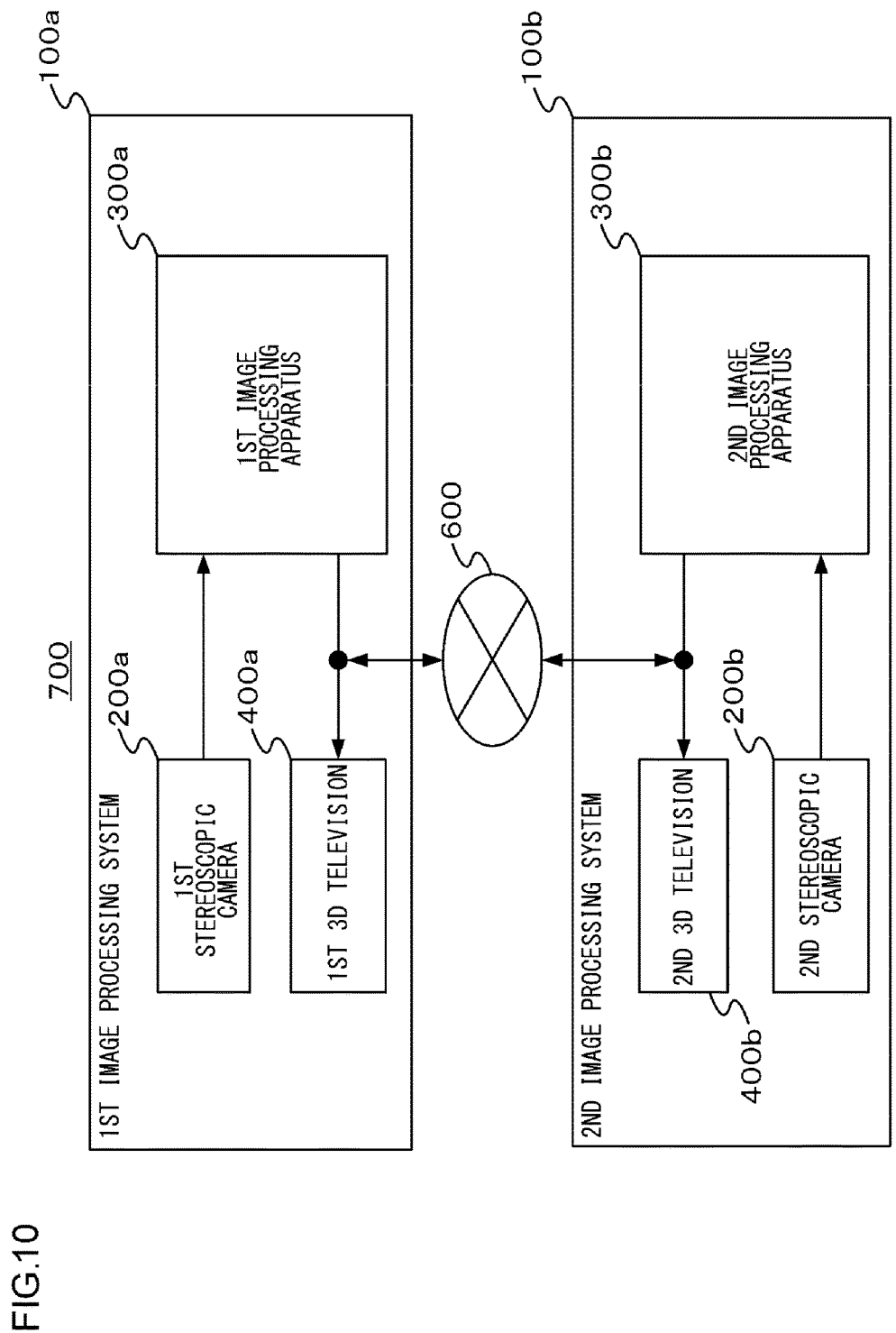
FIG. 10 schematically illustrates a 3D television telephone system according to an embodiment.

FIG. 10 schematically illustrates a 3D television telephone system 700 according to an embodiment. The 3D television telephone system 700 is an image communication system in which at least two image processing systems 100 are connected in a manner that permits communication with each other via a communication line 600. In the example shown in FIG. 10, a first image processing system 100a, including a first stereo camera 200a, a first image processing apparatus 300a, and a first 3D television 400a, and a second image processing system 100b, including a second stereo camera 200b, a second image processing apparatus 300b, and a second 3D television 400b, are connected in a manner that permits mutual communication via the communication line 600 such as the Internet.

Figure 11:
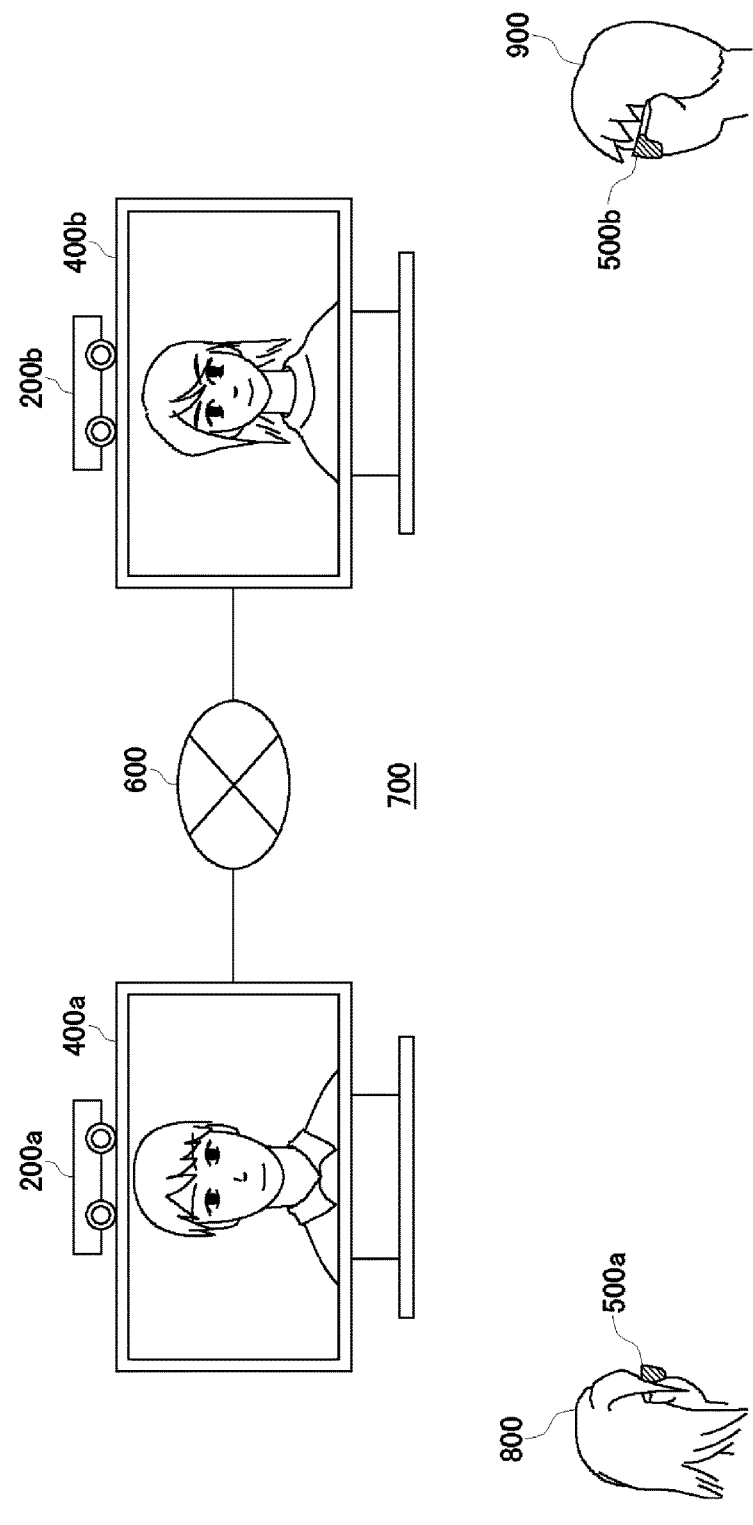
FIG. 11 illustrates a usage example of a 3D television telephone system according to an embodiment.

FIG. 11 illustrates a usage example of the 3D television telephone system 11 according to an embodiment. The first stereo camera 200a takes images of an object including the face of a first user 800 wearing 3D glasses 500a. The images taken by the first stereo camera 200a are subjected to special effects of various augmented realities such as the exclusion of the glasses and the correction of the image pickup position and then are transmitted to the second 3D television 400b via the communication line 600. A second user 900 wearing 3D glasses 500b watches the second 3D television 400b, so that the second user 900 can watch the stereoscopic images sent from the first image processing apparatus 300a.

In FIG. 11, the images taken by the first stereo camera 200a have already been subjected to the special effects of augmented realities, so that the 3D glasses 500a are removed in the images of first user 800 displayed on the second 3D television 400b even though the first user 800 is actually wearing the 3D glasses 500a.

Similarly, the images of the second user 900 wearing the 3D glasses 500b are subjected to the special effects of augmented realities and then are sent to the first 3D television 400a that the first user 800 watches. In this manner, by employing the 3D television telephone system 700, the users can video chat using the images that have been subjected to the special effects of augmented realities.

Figure 12:
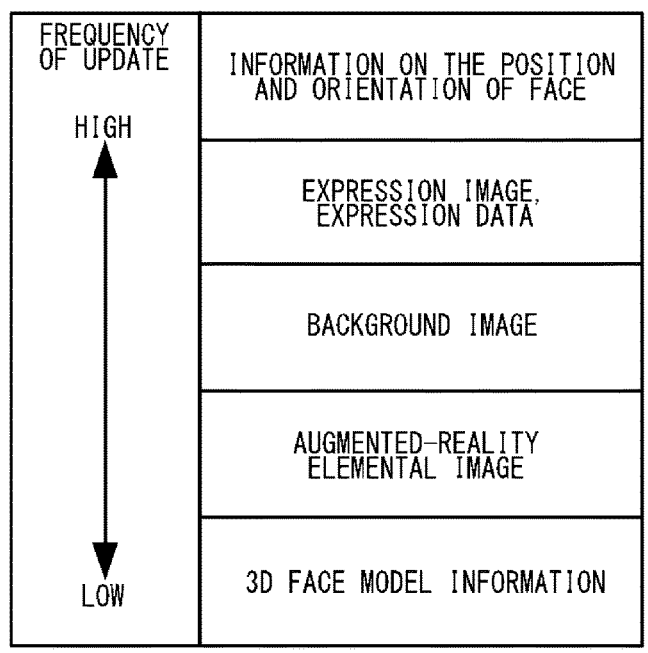
FIG. 12 shows transmission frequency according to the types of information transmitted in a 3D television telephone system according to an embodiment.

FIG. 12 shows transmission frequency according to the types of information transmitted in the 3D television telephone system 700 according to an embodiment. The 3D television telephone system 700 according to the embodiment converts the stereoscopic images generated at a transmission side into a transmission format of stereoscopic images such as MVC (Multi-view Video Coding) so as to be transmitted.

As described earlier, the 3D glasses serve as the landmark in the present embodiment and therefore the 3D model of the face can be generated stably and with a high degree of accuracy and furthermore the rendering elements such as the background image and the expression images can be separated from each other. Thus, in the present embodiment, the information, such as the position and orientation of the user's face, expression images, and expression data, which requires the real-timeliness is gathered together and combined in units of frame and is transmitted in real time. On the other hand, the 3D model of the face, the special effects using the augmented reality, and the like are transmitted beforehand prior to the communication by the 3D television telephone and therefore these are not transmitted in units of frame.

As shown in FIG. 12, the information requiring a higher level of the real-timeliness is transmitted more frequently than the information requiring a lower level thereof is transmitted. As a result, the 3D television telephone can be achieved at a high quality and a high bit rate. Also, since the background image is separated from the other images, the background image may be replaced by another image, the frame rate when it is to be sent can be reduced, and the compression rate thereof can be raised.

An operation implementing the above-described structure is as follows. The user wears the 3D glasses and uses the image processing system 100. The stereo camera 200 captures the images of an object including the user wearing the 3D glasses. The facial region of the user's face is detected using the 3D glasses 500 as the landmark, and various special effects of augmented realities are rendered. The images to which a special effect of augmented reality has been rendered are displayed on the 3D television 400 and are transmitted to another image processing system 100.

As described above, the embodiments provide a new usage field where the 3D glasses 500 are not only used to watch the stereoscopic images but also used as the landmark in rendering special effects of augmented realities.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

The description has been given of a case where the shutter glasses are employed but this should not be limited to the 3D glasses 500 and, for example, polarized glasses may be employed instead. In such a case, a lenticular marker, a light-emitting diode or the like is added to the glasses frame, so that the polarized glasses may be used as the landmark. In particular, the lenticular marker is characterized by the feature that the design or pattern thereof varies when viewed from different angles. Thus, it is advantageous in that the orientation and the angle of the face can be measured by converting a relative angle between the glasses and the camera into a change in the pattern. Also, in order to facilitate the observation of the expression areas 334, an under-rim glasses frame that covers the lower half of the lens may be employed.

The description has been given of a case where used are the stereo cameras 200 including the first camera 202 and the second camera 204 that capture the images of the user from different viewpoints. However, the image pickup devices are not limited to the stereo cameras but may be a monocular camera instead. In this case, the feature points detected by the feature point detector 310 are directly mapped to a 3D model of a general-use face. As compared with the case where the stereo cameras are used, the accuracy of mapping may drop but if the fact that the accuracy is not so much important factor in the augmented reality where the 3D model is used is taken into consideration, this modification will be advantageous in terms of the suppressed cost because only the single unit of camera is used.

What is claimed is:

1. An image processing apparatus comprising at least one processor operating under control of executable computer code stored in a non-tangible, computer readable recording medium, such that the image processing apparatus operates to:
    obtain an image of an object, which includes a face of a person wearing an optical display apparatus by which to observe a stereoscopic image that contains a first parallax image and a second parallax image obtained when the object in a three-dimensional (3D) space is viewed from different viewpoints;
    identify the optical display apparatus included in the image of the object; and
    generate an image of the face of the person that does not include the optical display apparatus by excluding the identified optical display apparatus, and instead by adding features of the face of the person to a region in which the identified optical display apparatus is excluded.

2. The image processing apparatus according to claim 1, wherein the image of the object is obtained via a stereoscopic camera including a first camera and a second camera that take images of the first parallax image and the second parallax image, respectively, when the object in the three-dimensional space is viewed from different viewpoints.

3. The image processing apparatus according to claim 2, wherein the image processing apparatus operates to:
    detect a facial region of the face of the person included in the image of the object, based on the identified optical display apparatus;
    generate the image of the face of the person that does not include the optical display apparatus by excluding the identified optical display apparatus, and by adding the face of the person to the detected facial region,
    wherein the detection of the facial region of the face of the person includes detecting respective facial regions for the first parallax image and the second parallax image, respectively.

4. The image processing apparatus according to claim 3, wherein the detection of the respective facial regions is carried out by:
    a feature point detector circuit operating to detect feature points from the first parallax image and the second parallax image, respectively;
    a 3D model generator circuit operating to generate a 3D model of the person based on the facial regions detected and the feature points detected, respectively, from the first parallax image and the second parallax image by the feature point detector circuit; and
    an image pickup position correcting circuit operating to generate images of the person taken from arbitrary directions based on the 3D model of the person generated by the 3D model generator circuit.

5. The image processing apparatus according to claim 1, wherein the image processing apparatus further operates to add a virtual feature to the image of the image of the face of the person.

6. The image processing apparatus according to claim 5, further comprising:
    a mirror-image generator circuit operating to produce the virtual feature by generating a 3D model where the person is reflected in a mirror image, based on the 3D model of the person generated by the 3D model generator circuit,
    a stereoscopic image generator circuit operating to generate a stereoscopic image based on the mirror image of the person generated by the mirror-image generator circuit, the stereoscopic image containing the first parallax image and the second parallax image obtained when the 3D model of the person in a virtual 3D space is viewed from different viewpoints; and
    an output circuit operating to output the stereoscopic image generated by the stereoscopic image generator circuit.

7. An image processing method executed by a processor, comprising:
    capturing an image of an object, which includes a face of a person wearing an optical display apparatus by which to observe a stereoscopic image that contains a first parallax image and a second parallax image obtained when the object in a three-dimensional (3D) space is viewed from different viewpoints;
    identifying the optical display apparatus included in the image of the object; and
    generating an image of the face of the person that does not include the optical display apparatus by excluding the identified optical display apparatus, and instead by adding features of the face of the person to a region in which the identified optical display apparatus is excluded.

8. The image processing method according to claim 7, wherein the image of the object is obtained via a stereoscopic camera including a first camera and a second camera that take images of the first parallax image and the second parallax image, respectively, when the object in the three-dimensional space is viewed from different viewpoints.

9. The image processing method according to claim 8, further comprising:
   detecting a facial region of the face of the person included in the image of the object, based on the identified optical display apparatus;
   generating the image of the face of the person that does not include the optical display apparatus by excluding the identified optical display apparatus, and by adding the face of the person to the detected facial region,
   wherein the detection of the facial region of the face of the person includes detecting respective facial regions for the first parallax image and the second parallax image, respectively.

10. The image processing method according to claim 9, wherein the detection of the respective facial regions is carried out by:
   detecting feature points from the first parallax image and the second parallax image, respectively;
   generating a 3D model of the person based on the facial regions detected and the feature points detected, respectively, from the first parallax image and the second parallax image by the feature point detector circuit; and
   generating images of the person taken from arbitrary directions based on the 3D model of the person generated by the 3D model generator circuit.

11. The image processing method according to claim 7, further comprising adding a virtual feature to the image of the image of the face of the person.

12. The image processing method according to claim 11, further comprising:
   producing the virtual feature by generating a 3D model where the person is reflected in a mirror image, based on the 3D model of the person generated,
   generating a stereoscopic image based on the mirror image of the person generated, the stereoscopic image containing the first parallax image and the second parallax image obtained when the 3D model of the person in a virtual 3D space is viewed from different viewpoints; and
   outputting the stereoscopic image generated for display.

13. A non-transitory computer-readable medium storing a computer program, which when executed by at least one computer processor, causes the processor to carry out actions, comprising:
   capturing an image of an object, which includes a face of a person wearing an optical display apparatus by which to observe a stereoscopic image that contains a first parallax image and a second parallax image obtained when the object in a three-dimensional (3D) space is viewed from different viewpoints;
   identifying the optical display apparatus included in the image of the object; and
   generating an image of the face of the person that does not include the optical display apparatus by excluding the identified optical display apparatus, and instead by adding features of the face of the person to a region in which the identified optical display apparatus is excluded.

14. The non-transitory computer-readable medium according to claim 13, wherein the image of the object is obtained via a stereoscopic camera including a first camera and a second camera that take images of the first parallax image and the second parallax image, respectively, when the object in the three-dimensional space is viewed from different viewpoints.

15. The non-transitory computer-readable medium according to claim 14, further comprising:
   detecting a facial region of the face of the person included in the image of the object, based on the identified optical display apparatus;
   generating the image of the face of the person that does not include the optical display apparatus by excluding the identified optical display apparatus, and by adding the face of the person to the detected facial region,
   wherein the detection of the facial region of the face of the person includes detecting respective facial regions for the first parallax image and the second parallax image, respectively.

16. The non-transitory computer-readable medium according to claim 15, wherein the detection of the respective facial regions is carried out by:
   detecting feature points from the first parallax image and the second parallax image, respectively;
   generating a 3D model of the person based on the facial regions detected and the feature points detected, respectively, from the first parallax image and the second parallax image by the feature point detector circuit; and
   generating images of the person taken from arbitrary directions based on the 3D model of the person generated by the 3D model generator circuit.

17. The non-transitory computer-readable medium according to claim 13, further comprising adding a virtual feature to the image of the image of the face of the person.

18. The non-transitory computer-readable medium according to claim 17, further comprising:
   producing the virtual feature by generating a 3D model where the person is reflected in a mirror image, based on the 3D model of the person generated,
   generating a stereoscopic image based on the mirror image of the person generated, the stereoscopic image containing the first parallax image and the second parallax image obtained when the 3D model of the person in a virtual 3D space is viewed from different viewpoints; and
   outputting the stereoscopic image generated for display.

* * * * *